US011679355B2

(12) United States Patent
Rodrigues et al.

(10) Patent No.: US 11,679,355 B2
(45) Date of Patent: Jun. 20, 2023

(54) ADSORBER FOR PURIFYING OR SEPARATING A GAS STREAM COMPRISING A REMOVABLE FILLING SYSTEM

(71) Applicant: L'Air Liquide, Société Anonyme pour l'Etude et l'Exploitation des Procédés Georges Claude, Paris (FR)

(72) Inventors: Guillaume Rodrigues, le Plessis Trevise (FR); Bernard Fraioli, Draveil (FR); Patrick Pereira, Chilly-Mazarin (FR); Patrick Le Bot, Vincennes (FR); Benjamin Morineau, Paris (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 473 days.

(21) Appl. No.: 16/975,046

(22) PCT Filed: Feb. 11, 2019

(86) PCT No.: PCT/FR2019/050293
§ 371 (c)(1),
(2) Date: Aug. 21, 2020

(87) PCT Pub. No.: WO2019/162591
PCT Pub. Date: Aug. 29, 2019

(65) Prior Publication Data
US 2020/0398211 A1 Dec. 24, 2020

(30) Foreign Application Priority Data
Feb. 23, 2018 (FR) ...................................... 1851601

(51) Int. Cl.
*B01D 53/04* (2006.01)
*B01J 8/02* (2006.01)
*B01D 53/047* (2006.01)

(52) U.S. Cl.
CPC ....... *B01D 53/047* (2013.01); *B01D 53/0423* (2013.01); *B01D 2253/304* (2013.01); *B01D 2256/12* (2013.01); *B01D 2259/4146* (2013.01)

(58) Field of Classification Search
CPC .. B01D 53/04; B01D 53/0423; B01D 53/047; B01D 53/0476; B01D 2253/304;
(Continued)

(56) References Cited

U.S. PATENT DOCUMENTS 2,884,372 A * 4/1959 Bergstrom ............. B01J 8/0278
208/113
3,479,146 A * 11/1969 Hochman ............. B01J 8/0278
422/220
(Continued)

FOREIGN PATENT DOCUMENTS

CN 1410142 4/2003
DE 11 00 660 3/1961
(Continued)

OTHER PUBLICATIONS

International Search Report for corresponding PCT/FR2019/050293, dated Jun. 24, 2019.

*Primary Examiner* — Frank M Lawrence, Jr.
(74) *Attorney, Agent, or Firm* — Elwood L. Haynes

(57) ABSTRACT

An adsorber for purifying or separating a gas stream, wherein a granular-material filling system is made up of a cylinder that is perforated over all or part of its height, of the top end thereof of diameter Dext, and of the bottom end thereof. The distance Din-Dext is greater than twice the size of particles of the second granular material. A first granular material and the second granular material follow one another in the direction of circulation of the gas stream and are such that M>ADN. And, the second granular material is in contact both with at least a part of the outer surface of the (Continued)

granular-material filling system and at least a part of the inner surface of the domed top end.

13 Claims, 3 Drawing Sheets

(58) Field of Classification Search
CPC ......... B01D 2256/12; B01D 2259/4146; B01J 8/003; B01J 8/025; B01J 8/0453; B01J 2208/00752; B01J 2208/00884; C01B 13/0259
USPC .......................................... 96/108, 138, 151
See application file for complete search history.

(56) References Cited

U.S. PATENT DOCUMENTS

| | | | |
|---|---|---|---|
| 4,030,896 A | | 6/1977 | Wimber et al. |
| 4,372,857 A | | 2/1983 | Matthews et al. |
| 4,938,422 A | | 7/1990 | Koves |
| 5,769,928 A | * | 6/1998 | Leavitt ............... B01D 53/0446 95/143 |
| 5,836,362 A | * | 11/1998 | Ackley ............... B01D 53/0407 141/34 |
| 5,873,929 A | * | 2/1999 | Andreani ........... B01D 53/0431 422/177 |
| 6,334,889 B1 | * | 1/2002 | Smolarek ........... B01D 53/0446 96/152 |
| 9,034,084 B2 | * | 5/2015 | Lomax ............... B01D 53/0446 96/152 |
| 9,861,947 B2 | * | 1/2018 | Palmer ................... B01J 8/0278 |
| 2003/0056649 A1 | | 3/2003 | Lee et al. |
| 2005/0155492 A1 | | 7/2005 | Baksh et al. |
| 2016/0158770 A1 | | 6/2016 | Ransbarger et al. |

FOREIGN PATENT DOCUMENTS

| | | |
|---|---|---|
| EP | 0 719 578 | 7/1996 |
| EP | 1 080 772 | 3/2001 |
| FR | 2 307 567 | 11/1976 |

\* cited by examiner

ADSORBER FOR PURIFYING OR SEPARATING A GAS STREAM COMPRISING A REMOVABLE FILLING SYSTEM

CROSS REFERENCE TO RELATED APPLICATIONS

This application is a 371 of International Application No. PCT/FR2019/050293, filed Feb. 11, 2019, which claims priority to French Patent Application No. 1851601, filed Feb. 23, 2018, the entire contents of which are incorporated herein by reference.

BACKGROUND

The present invention relates to an adsorber for purifying or separating a gas stream and to a method for filling this adsorber with adsorbent material.

O2 VSA (Vacuum Swing Adsorption) units are units for separating gases from the air by a pressure swing adsorption process in which the adsorption is substantially carried out at atmospheric pressure, referred to as high pressure, that is to say between 1 bara and 1.5 bar, and the desorption is carried out at a pressure below atmospheric pressure, typically between 0.3 and 0.5 bar. The production of gaseous oxygen achieves a purity of around 90% to 93% and the production range of this type of apparatus varies from 30 t/d to 200 t/d. These processes find applications in fields such as water purification, glass manufacture, the treatment of paper pulps, etc.

A compressor and a vacuum pump are often used to achieve the pressures of the cycle.

Note that, even though the present invention applies first and foremost to VSA processes, the present invention could also apply to all PSA processes (Pressure Swing Adsorption gas separation processes):

VPSA processes, in which the adsorption is carried out at a high pressure substantially greater than atmospheric pressure, that is to say generally between 1.6 and 8 bara, preferably between 2 and 6 bara, and the low pressure is below atmospheric pressure, typically between 30 and 800 mbara, preferably between 100 and 600 mbara.

PSA processes, in which the adsorption is carried out at a high pressure significantly greater than atmospheric pressure, typically between 1.6 and 50 bara, preferably between 2 and 35 bara, and the low pressure is above or substantially equal to atmospheric pressure, i.e. between 1 and 9 bara, preferably between 1.2 and 2.5 bara.

In the following text, the term (V)PSA will be used, which will encompass VSA, PSA, and VPSA processes.

(V)PSA cycles comprise at least the following steps: production, decompression, purge, recompression.

The units operate generally with a total cycle time greater than 30 seconds and employ one to three adsorbers.

A distinction will be made between 2 large families of adsorbers that are distinguished by the direction of flow of the gases, one being axial and the other radial. While the first is generally chosen for small-size units (<60 tonnes of O2 produced per day), the second is suitable for larger capacities. The axial technology needs to comply with a number of technical constraints including the minimization of pressure drops and empty volumes, the management of good gas distribution, retention of the adsorbents that can be entrained by the process gas or movements of the adsorbers while they are being transported from the workshop to the production site.

When very high flow rates need to be treated, the pressure drops and the problems of attrition become limiting for the axial technology. One solution consists in changing over to the radial geometry, which, by comparison, affords a reduced pressure drop for a given adsorber radius. Furthermore, the radial adsorber is not theoretically subject to any limitation in respect of attrition phenomena. The bed of adsorbent is retained between vertical perforated gratings. The major drawbacks of this radial technology are an increase in dead volumes, a limitation in the number of layers of adsorbent on account of the complexity of installation of the concentric gratings, the difficulty in ensuring good gas distribution, and a high manufacturing cost.

In the case of moderate flow rates, the axial geometries are chosen on account of their simplicity and their cost. The adsorption processes may impose a circulation of the gas from bottom to top, thus subjecting the granular material(s) to a fluidization limit.

The fluidization of the active granular materials can be caused by too substantial a stream of gas inherent to the normal operation of the process or during an accidental peak flow rate.

Against this background, a problem that arises is to provide an improved adsorber of axial geometry that exhibits better retention of the granular adsorbent(s).

SUMMARY

A solution according to the present invention is an adsorber for purifying or separating a gas stream, comprising:
- a cylindrical shell R,
- a domed bottom end F1,
- a domed top end F2 comprising a main filling orifice for a granular material; with said orifice having an inside diameter Din,
- a granular material of grain size ADN,
- a granular material of grain size M, and
- a granular-material filling system A that is removable from the shell and positioned in the main filling orifice, characterized in that:
- the filling system A is made up of a cylinder that is perforated over all or part of its height, of the top end thereof of diameter Dext, and of the bottom end thereof,
- the distance Din-Dext is strictly greater than twice the size of the particles of the material of grain size M,
- the granular material of grain size ADN and the granular material of grain size M follow one another in the direction of circulation of the gas stream and are such that M>ADN,
- the material of grain size M is in contact both with at least a part of the outer surface of the system A and at least a part of the inner surface of the domed top end F2.

The configuration of the adsorber according to the invention makes it possible to:
- retain the adsorbent bed,
- ensure a better gas distribution, and
- ensure better filling of the adsorber.

As the case may be, the adsorber according to the invention can exhibit one or more of the following features:
- the material of grain size M is in contact with all of the outer surface of the system A contained inside the cylindrical shell.

the material of grain size M is in contact with at least 10%, preferably at least 20%, even more preferably at least 30%, of the inner surface of the domed top end F2.

the domed top end F2 comprises at least two secondary filling orifices with a diameter smaller than the main orifice.

the secondary orifices have a diameter 2 to 6 times smaller than the main orifice.

the material of grain size M is supplemented with a supplementary material of grain size MC smaller than or equal to M, preferably a supplementary material having a grain size MC three times smaller than the grain size M. Specifically, it is a matter of avoiding any flow of the material MC into the gaps in the material M.

said adsorber comprises in succession in the direction of circulation of the gas stream, N layers (N≥1): a first layer of a granular material of grain size AD1, an Nth-1 layer of a granular material of grain size ADN, and an Nth layer of a granular material of grain size M, where M>AD2>AD1.

the first layer of a granular material of grain size AD1 is supported by a rigid metal grating covered with a mesh fabric.

the first layer of a granular material of grain size AD1 is supported by a granular material of grain size MGS larger than AD1.

the granular material of grain size ADN is separated from the granular material of grain size M by a flexible fabric or a rigid grating covered with a flexible fabric.

the granular material of grain size ADN rests directly on the granular material of grain size M. It goes without saying that, in this case, the granular material of grain size M will be selected such that it does not allow the material of grain size ADN to flow into it.

The adsorber R in question is of vertical axial geometry and has two ends, of which at least the top end is domed.

It also has two gas circulation orifices, one at the bottom end, the second at the domed top end. The latter is also the main filling orifice for the granular materials and allows the installation of the system (A).

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

A gas distributor can be installed in the bottom part. At least one layer of active granular material is contained in the shell R, 2 layers being presumed here. The first layer of adsorbent material AD1 can be supported either by a rigid metal grating covered with a mesh fabric with a sufficiently fine mesh to retain the adsorbent material or by a material of grain size MGS larger than that of the adsorbent material, thereby making it possible to limit pressure drops while filling a part of the empty volume, the latter possibly being detrimental to the performance of the process.

The volume on top of the final layer of active material of grain size ADN is filled with at least one type of granular material of grain size M larger than ADN. A flexible fabric S, preferably a metal fabric, or a rigid grating covered with a flexible fabric separates the materials of grain size ADN and M.

The material of grain size M is in contact with a significant part of the domed top end and of the system A, such that, in the event of too substantial a flow rate or movement of the adsorber, the forces exerted on the active granular materials are transmitted to the walls of the shell R and to the system A via the material of grain size M.

It is necessary to ensure a maximum area of contact between the material of grain size M, the upper wall of the shell R and the system A.

Figure 4:
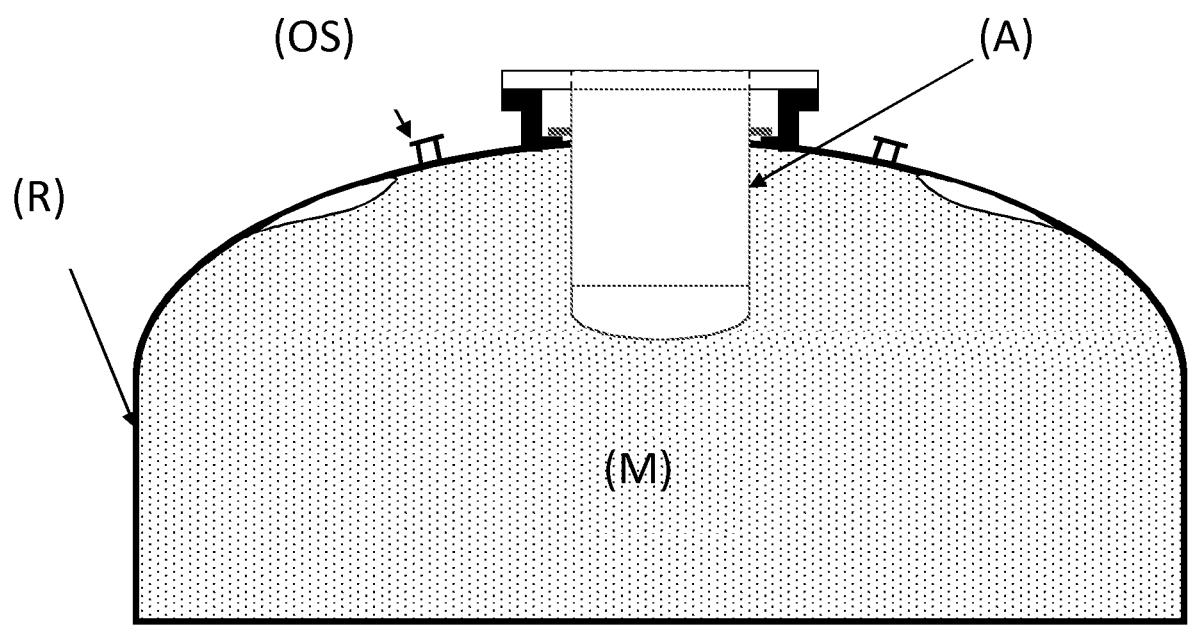

For this purpose, the top end volume is first of all filled with the material of grain size M in a compact manner, while leaving a space at the center for inserting the system A. Filling in a compact manner is understood as meaning filling of the rain type. Specifically, depending on the filling method, the empty volume between the particles of the material of grain size M can vary substantially on account of a more or less tight stack of the particles that make it up—filling of the rain type is considered to be compact, whereas "loose" filling during which the material is poured without particular attention is considered to be less compact. A granular medium initially filled by any method and the container of which is subjected to standardized impacts will have an intermediate compactness between the 2 compactnesses "rain" and "loose" mentioned above. After being fitted, the end of the system A will then be in contact with the material of grain size M via its bottom D.

the outside diameter of the system A is chosen to have a size smaller than the inside diameter of the outlet orifice situated in the domed end F2 such that balls (which may be materials with non-spherical shapes) of the material of grain size M can be introduced into the annular space thus created.

additional filling orifices OS (FIG. 4), with a diameter smaller than that of the main orifice, make it possible to supplement the filling of the domed end with a granular material of grain size MC identical to or smaller than the material of grain size M.

Compact filling of the granular materials is necessary in order to ensure maintenance over time of the area of contact between the material of grain size M and the shell R and the system A. If this were not the case, a supplement of the material of grain size M through the annular space between the system (A) and the main filling orifice and/or through the orifices (OS) would be necessary after the adsorber has been subjected to movement or vibrations. Various filling systems make it possible to achieve optimal filling compactness. By way of example, for spherical or pseudo-spherical granular materials, an extra-granular void ratio of the active materials of 35% can be obtained by a system of crossed screens. While the filling of the material of grain size M before the fitting of the system and the filling of the lower layers AD1 to ADN can be effected in a compact manner, that is to say by rain-type flow, for the filling of the shell R with granular material of grain size M via the space contained between the outside diameter of the system A and the inside diameter of the filling orifice and the filling of the shell R with supplementary material of grain size MC through the secondary filling orifices, this is not possible. Specifically, there is not enough space to introduce into these orifices the tools allowing rain-type flow. In the event of vibration of the container, de-compacting of the granular material can then be observed and can result in an increase in the desired area of contact with the material of grain size M.

Figure 1:
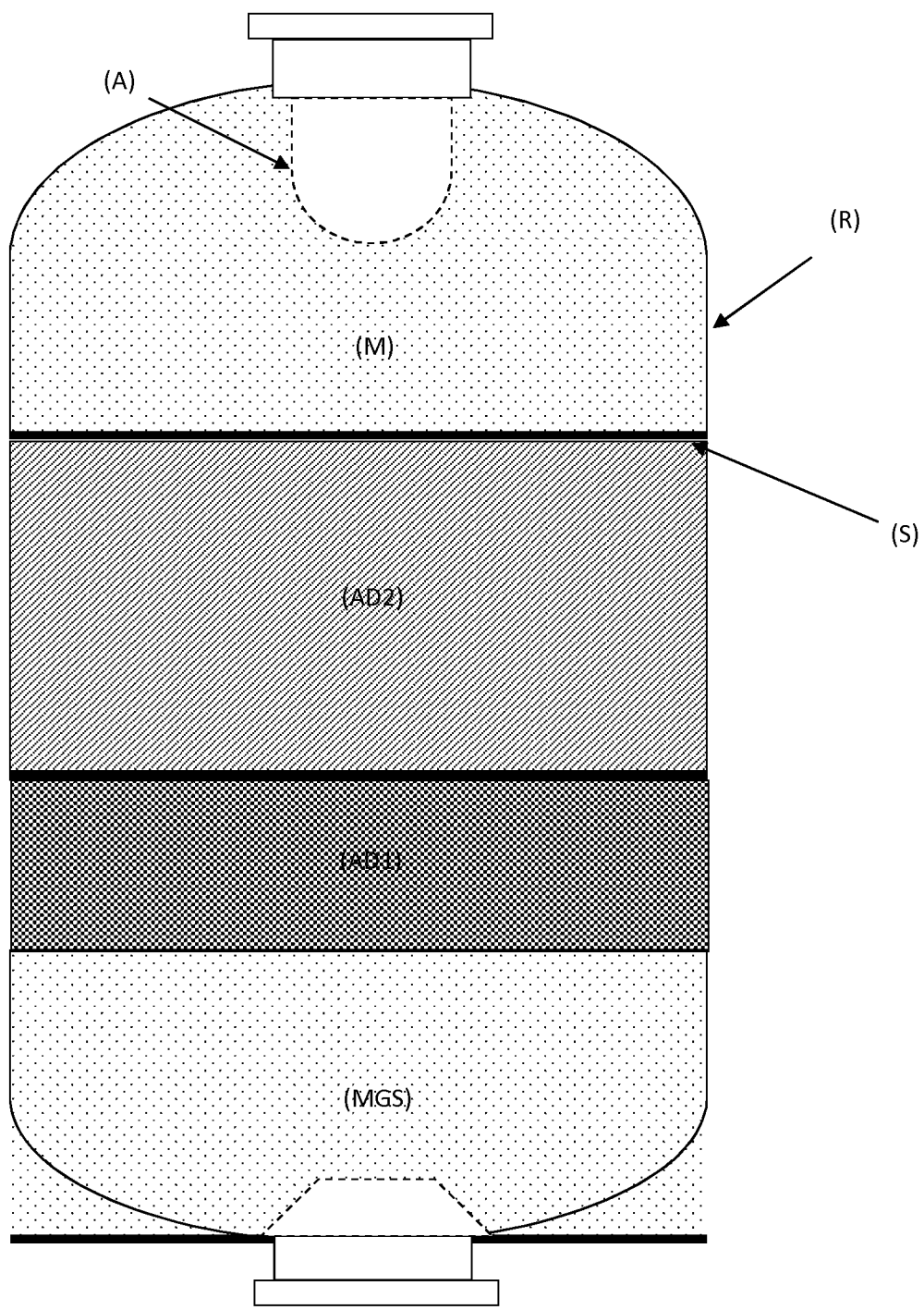
FIG. 1 shows an example of an adsorber, in accordance with one embodiment of the present invention.
Figure 2:
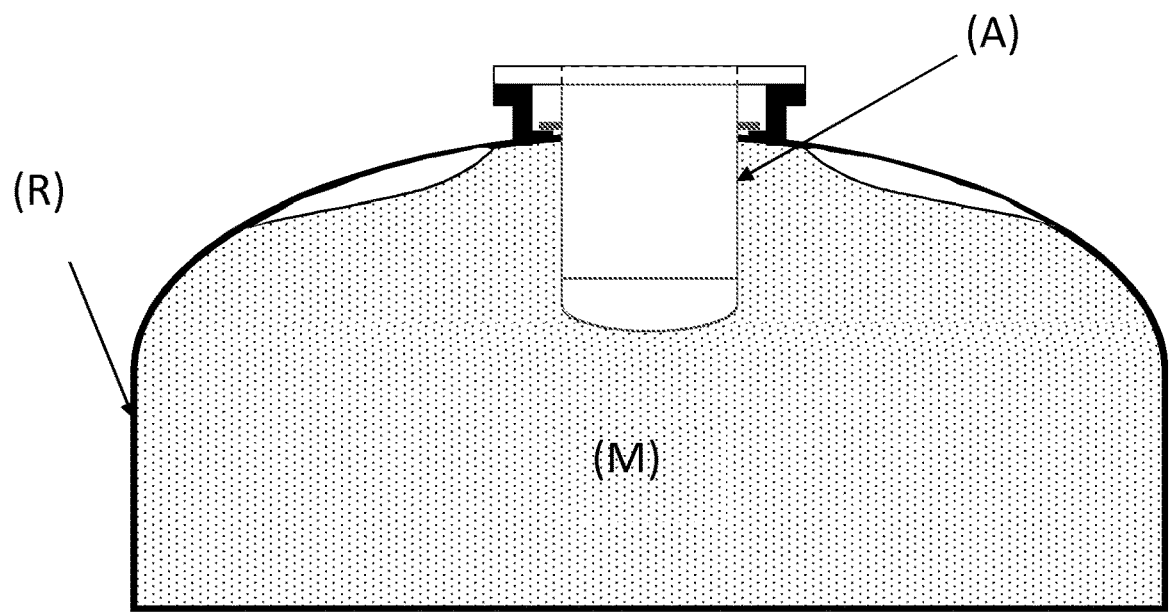
FIG. 2 is a schematic representation of a face-on view, in accordance with one embodiment of the present invention.
Figure 3:
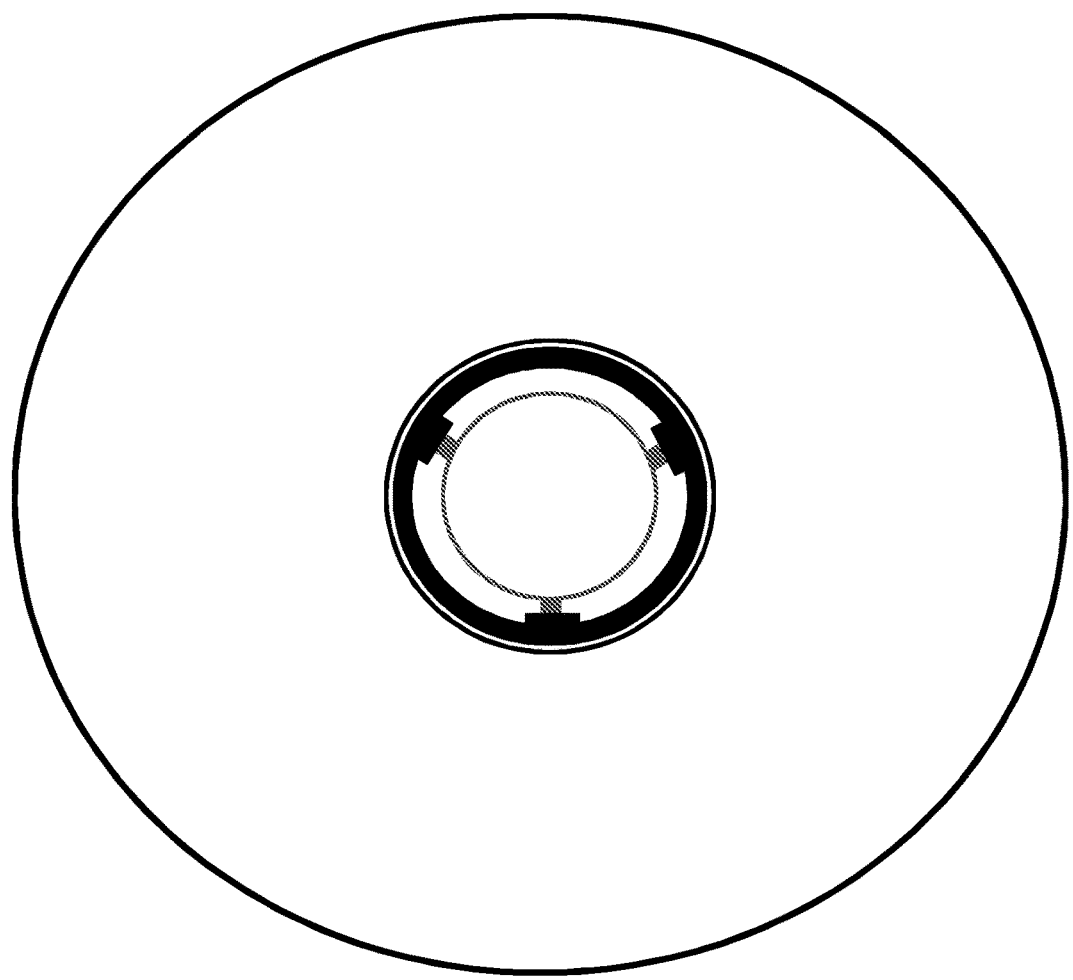
FIG. 3 is a schematic representation of a top view, in accordance with one embodiment of the present invention.

FIGS. 2 and 3 illustrate the system A by providing a diagram of a face-on view and a diagram of a top view.

The system A is provided with fixing tabs that can rest on lugs integral with the main filling orifice.

A further subject of the present invention is a method for filling an adsorber according to the invention with adsorbent material, comprising the following successive steps:
a) partial filling of the shell R with granular material of grain size AD2 through the main filling orifice;
b) partial filling of the shell R with granular material of grain size M through the main filling orifice, leaving a volume that allows the filling system A to be fitted;
c) fitting of the filling system A in the filling orifice so as to bring the bottom end of the filling system into contact with the material of grain size M;
d) filling of the shell R with granular material of grain size M through the space between the outside diameter of the system A and the inside diameter of the filling orifice.

Note that, in step b), it is possible for the volume that allows the filling system A to be fitted not to be a cylinder, since there is flow of the granular material of grain size M at the angle of repose.

Preferably, the domed top end F2 comprises at least two secondary filling orifices with a diameter smaller than the main orifice and said method comprises a step e) of filling the shell R with supplementary material of grain size MC through the secondary filling orifices OS.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An adsorber for purifying or separating a gas stream, comprising:
    a cylindrical shell,
    a domed bottom end,
    a domed top end comprising a main filling orifice for a granular material; with said orifice having an inside diameter Din,
    a first granular material of grain size ADN,
    a second granular material of grain size M, and
    a granular-material filling system that is removable from the shell and positioned in the main filling orifice,
    wherein,
        the granular-material filling system is made up of a cylinder that is perforated over all or part of the height, of the top end thereof of diameter Dext, and of the bottom end thereof,
        the distance Din-Dext is greater than twice the grain size of the particles of the second granular material,
        the first granular material and the second granular material follow one another in the direction of circulation of the gas stream and are such that M>ADN,
        the second material is in contact both with at least a part of the outer surface of the granular-material filling system and at least a part of the inner surface of the domed top end.

2. The adsorber as claimed in claim 1, wherein the second granular material is in contact with all of the outer surface of the granular-material filling system contained inside the cylindrical shell.

3. The adsorber as claimed in claim 1, wherein the second granular material is in contact with at least 10% of the inner surface of the domed top end.

4. The adsorber as claimed in claim 1, wherein the domed top end comprises at least two secondary filling orifices with a diameter smaller than the main filling orifice.

5. The adsorber as claimed in claim 4, wherein the secondary filling orifices have a diameter 2 to 6 times smaller than the main filling orifice.

6. The adsorber as claimed in claim 1, wherein the material of second granular material is supplemented with a supplementary material of grain size MC smaller than or equal to M.

7. The adsorber as claimed in claim 1, further comprising, in succession in the direction of circulation of the gas stream (N≥1):
    a succession of N layers of granular materials of increasing grain size AD1 to ADN; and
    a layer of the secondary granular material.

8. The adsorber as claimed in claim 7, wherein the first layer of a granular material of grain size AD1 is supported by a rigid metal grating covered with a mesh fabric.

9. The adsorber as claimed in claim 7, wherein the first layer of a granular material of grain size AD1 is supported by a granular material of grain size MGS larger than AD1.

10. The adsorber as claimed in claim 7, wherein the granular material of grain size ADN is separated from the granular material of grain size M by a flexible fabric or a rigid grating covered with a flexible fabric.

11. The adsorber as claimed in claim 7, characterized in that the first granular material rests directly on the second granular material.

12. A method for filling an adsorber as claimed in claim 1 with adsorbent material, comprising:
a) partial filling of the shell with the first granular material through the main filling orifice with the filling system removed;
b) partial filling of the shell with second granular material through the main filling orifice, leaving free a volume that allows the filling system to be fitted;
c) fitting of the filling system in the filling orifice so as to bring the bottom end of the filling system into contact with the second granular material; and
d) filling of the shell with the second granular material through a space between the outside diameter of the filling system and the inside diameter of the filling orifice.

13. The filling method as claimed in claim 12, wherein the domed top end comprises at least two secondary filling orifices with a diameter smaller than the main filling orifice and said method comprises a step e) of filling the shell with supplementary material of grain size MC through the secondary filling orifices.

* * * * *